US008504668B2

(12) United States Patent
Sudit

(10) Patent No.: US 8,504,668 B2
(45) Date of Patent: Aug. 6, 2013

(54) SYSTEM AND METHOD FOR MANAGING DELIVERY OF PUBLIC SERVICES

(75) Inventor: Isaias Sudit, Delray Beach, FL (US)

(73) Assignee: Gridglo Corp., Delray Beach, FL (US)

( * ) Notice: Subject to any disclaimer, the term of this patent is extended or adjusted under 35 U.S.C. 154(b) by 248 days.

(21) Appl. No.: 12/697,326

(22) Filed: Feb. 1, 2010

(65) Prior Publication Data

US 2011/0191475 A1    Aug. 4, 2011

(51) Int. Cl.
    *G06F 15/173* (2006.01)
(52) U.S. Cl.
    USPC ............ 709/223; 709/217; 709/224; 700/295
(58) Field of Classification Search
    USPC .......................... 709/223, 224, 217; 700/295
    See application file for complete search history.

(56) References Cited

U.S. PATENT DOCUMENTS

| | | | | |
|---|---|---|---|---|
| 7,953,518 B2* | 5/2011 | Kansal et al. | ................. | 700/295 |
| 8,172,147 B2* | 5/2012 | Smith | ........................... | 235/487 |
| 2002/0147006 A1* | 10/2002 | Coon et al. | ..................... | 455/420 |
| 2003/0176952 A1* | 9/2003 | Collins et al. | ................. | 700/286 |
| 2005/0171645 A1* | 8/2005 | Oswald et al. | ................ | 700/276 |
| 2008/0231468 A1* | 9/2008 | Myllymaki | ............. | 340/870.17 |
| 2009/0157529 A1* | 6/2009 | Ehlers et al. | ..................... | 705/26 |
| 2010/0063644 A1* | 3/2010 | Kansal et al. | ................ | 700/295 |
| 2010/0082175 A1* | 4/2010 | Gartner | ......................... | 700/295 |
| 2010/0106575 A1* | 4/2010 | Bixby et al. | ............... | 705/14.11 |
| 2010/0179708 A1* | 7/2010 | Watson et al. | ................ | 700/296 |
| 2010/0255856 A1* | 10/2010 | Kansal et al. | .............. | 455/456.1 |
| 2010/0289643 A1* | 11/2010 | Trundle et al. | ............. | 340/545.1 |
| 2011/0166839 A1* | 7/2011 | Smith | ............................. | 703/2 |
| 2011/0238311 A1* | 9/2011 | Kuhns et al. | ...................... | 702/1 |
| 2011/0246898 A1* | 10/2011 | Imes et al. | ..................... | 715/735 |
| 2012/0089269 A1* | 4/2012 | Weaver et al. | ................ | 700/295 |

* cited by examiner

*Primary Examiner* — Lashonda Jacobs
(74) *Attorney, Agent, or Firm* — Fox Rothschild, LLP; Robert J. Sacco

(57) ABSTRACT

Systems and methods of managing public services provided by a utility are described. The method includes determining a presence of one or more users at a particular location based on a current status of one or more communication devices. The method further includes predicting consumption of the public service responsive to the determining step.

24 Claims, 4 Drawing Sheets

100

114

400

SYSTEM AND METHOD FOR MANAGING DELIVERY OF PUBLIC SERVICES

FIELD OF THE INVENTION

The present invention relates to the delivery of public services, and more specifically to systems and methods for managing the delivery of public services.

BACKGROUND

The delivery of electrical energy is typically achieved providing a power grid including one or all of the following elements: electricity generation, electric power transmission, and electricity distribution elements. Electricity may be generated using generating stations, such as a coal fire power plant, a nuclear power plant, etc., and transmitted over transmission lines. The transmission lines may transmit the power long distances, such as across state lines or across international boundaries, until it reaches its wholesale customer, which may be a company that owns a local distribution network. The local distribution network can include substations, feeder circuits, and distribution transformers to deliver power to consumers.

In general, a local power company will manage operation and maintenance of the local distribution network. Therefore, the local power company will manage demand, faults, maintenance, and upgrades related to the local distribution network. However, the management of the local distribution is often inefficient and costly. For example, the local power company can manage demand based on historical usage trends, but will still have to move quickly to obtain and distribute additional electrical power when demand rises due to unforeseen or unexpected events. Further, the local power company may be able to detect global faults and other problems along the main branches of the local distribution network, but still generally relies on consumers and field workers to identify localized outages or issues with the local distribution network.

One proposed solution for monitoring the operational status of one or more portions of a power grid is the use of so-called "smart grid" technologies. To provide a smart grid, it is generally necessary for a power companies to install several additional hardware components at various points of the local distribution network. For example, intelligent meters (sometimes called "smart meters") are a type of advanced meter that identifies consumption in more detail than conventional meters. Additionally, intelligent or "smart" appliances can also be provided to communicate usage information for individual appliances. These devices are generally configured to communicate usage and other information via some network back to the local utility for monitoring and billing purposes (tele-metering) and for building forecast models for energy consumption.

SUMMARY

Embodiments of the present invention describe systems and methods for managing delivery of public services. In a first embodiment of the invention, a method of managing a public service provided by a utility is provided. The method includes the step of determining a presence of one or more users at a particular location based on a current status of one or more communication devices. The method further includes the step of predicting consumption of the public service responsive to the determining step.

In a second embodiment of the invention, a system for managing a public service provided by a utility is provided. The system, includes an estimation/registration (E/R) system. The E/R system includes a storage element for receiving a current status of one or more communications devices. The E/R system also includes a processing element configured for determining a presence of one or more users at a particular location based on the current status of the communications devices and predicting consumption of the public service responsive to determining the prescence of the users at the particular location.

DETAILED DESCRIPTION

Figure 1:
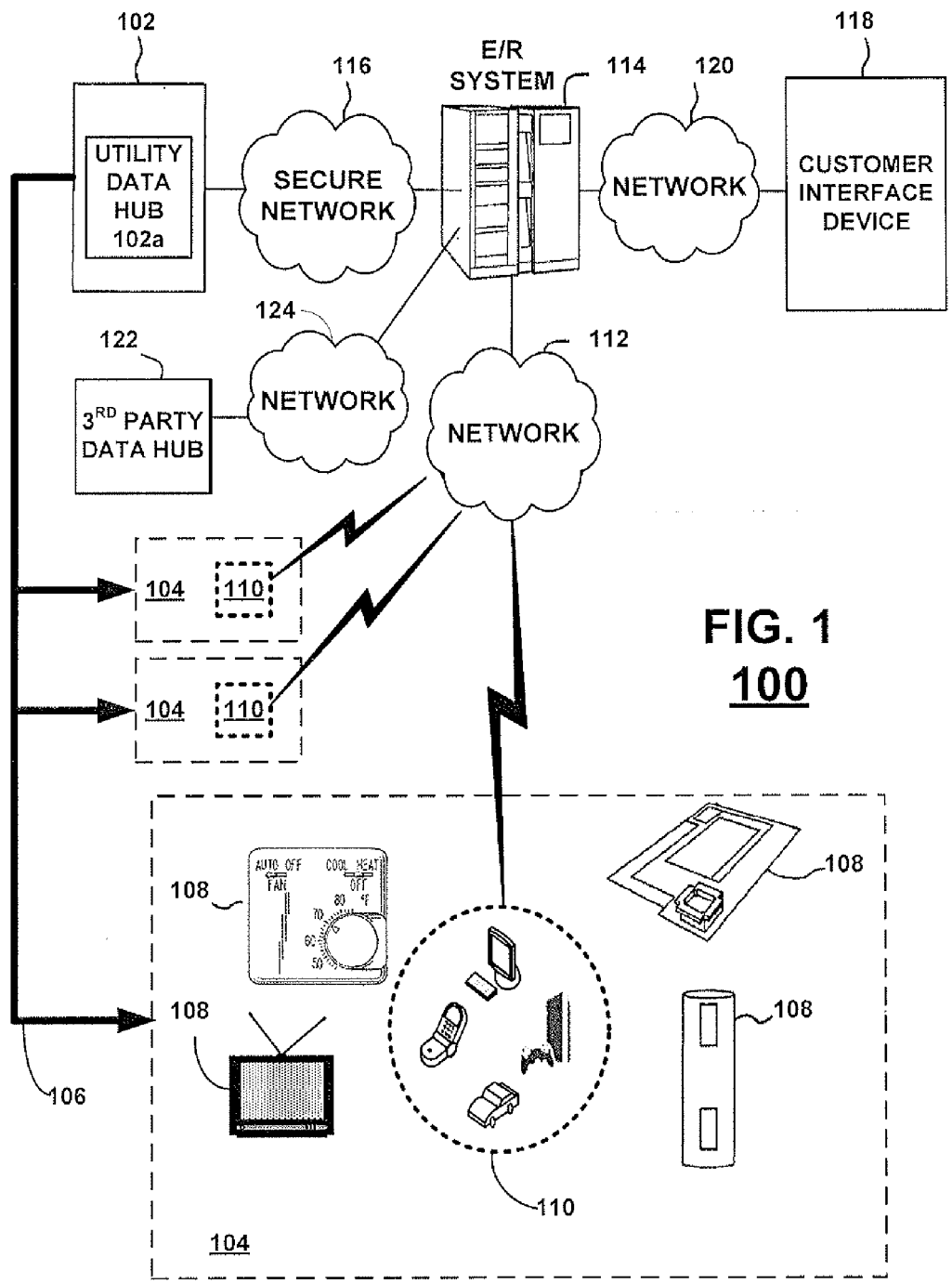
FIG. 1 is a schematic diagram of a system for delivering public services in accordance with an embodiment of the invention.

The present invention is described with reference to the attached figures, wherein like reference numerals are used throughout the figures to designate similar or equivalent elements. The figures are not drawn to scale and they are provided merely to illustrate the instant invention. Several aspects of the invention are described below with reference to example applications for illustration. It should be understood that numerous specific details, relationships, and methods are set forth to provide a full understanding of the invention. One having ordinary skill in the relevant art, however, will readily recognize that the invention can be practiced without one or more of the specific details or with other methods. In other instances, well-known structures or operations are not shown in detail to avoid obscuring the invention. The present invention is not limited by the illustrated ordering of acts or events, as some acts may occur in different orders and/or concurrently with other acts or events. Furthermore, not all illustrated acts or events are required to implement a methodology in accordance with the present invention.

As described above, smart grid techniques have been proposed as one method for monitoring power grids for maintenance and forecasting purposes. However, the deployment of smart grid technologies in existing power grids is a costly and time consuming process. Further, the adoption of smart appliances by consumers is expected to require a significant period of time for full deployment. As a result, conventional power grids and even partially converted power grids will generally suffer from a lack of usage data, leading to inaccurate power consumption forecasting and ultimately increased difficult in managing the operation and maintenance of local distribution networks. A similar problem arises in managing the operation and maintenance of other types of public services.

As used herein, the term "public services" refers to services consumed by the public provided a public utility via a physical infrastructure. Such services can include electricity, natural gas, water, and sewage, to name a few. However, the various embodiments of the invention are not limited in this regard and public services can encompass any other type of services that can be delivered via a physical infrastructure. The term "public utility" as used herein, refers to a governmental and/or private organization providing the one or more public services and maintaining and/or managing the physical infrastructure for the public services.

In general, the presence of an additional person at a location causes an incremental increase in the use of public utilities at a location. For example, as the number of persons in a home is increased, the amount of hot water being used for washing and bathing may be increased. Therefore, this results in an increase in the consumption of two public services, water and the electricity to heat the water. Further, based on the type of location and the types of persons at a location, usage can also vary. For example, the type and amount of public services used at a home by a person is different than the type and amount of public services used by that same person at a different location, such as a workplace. In another example, persons of a particular age group or profession may engage in activities that utilize a greater amount of public services than another person of a different age group or profession at the same location.

Although usage of a public service at a location could be modeled based on the activities and persons typically present at a location, such modeling is ultimately inaccurate because such models fail to account for changes in the number of persons at a location. Further, because persons may engage in different types of activities at a location, usage of public services can also vary according to the different activities. As a result, it is generally difficult for public utilities to accurately model and estimate usage.

Accordingly, to provide a more accurate estimation of usage of public services that captures changes in number of persons and/or the behavior of such persons at a location, embodiments of the invention provide for estimating use of public services based on tracking the status of users' communications devices. Such status information can include a location of the communications device and a current activity of the communications device. Activities of a communications device can encompass both network and non-network activities. Network activities of the communications device can include activities in which the communications device is exchanging signals over a network connection. For example, network activities can include exchanging signals for voice and/or data communications. Non-network activities of the communications device can include activities in which the communications device is performing actions locally. For example, accessing locally stored data, such as documents, photos, video, music, or games.

As used herein, the term "communications device" includes any apparatus capable of exchanging data over a communications network by either wireless or wireline means. For example, communications devices can encompass landline telephones, mobile or cellular telephones, portable and non-portable computing devices connected to a data network, networked video game consoles, and set-top box devices, to name a few. However, the various embodiments of the invention are not limited in this regard and any other communications devices can be used in the various embodiments of the invention.

In the various embodiments, tracking a status of communications devices can advantageously provide a means for improving estimation of energy usage for several reasons. First, some types of communications devices are generally associated with a single person. For example, a mobile phone is generally used primarily by the person registered with the mobile phone. As a result, the location of such a communications device is generally a good indicator of the location of the associated person. Second, by monitoring the current activities of the communications device, a further confirmation of the user's location can be provided. For example, if a mobile phone is currently engaged in a call or other activity, it is reasonable to assume that the user is at the location associated with the mobile phone. Therefore, since the status of communications devices can be used to ascertain the locations of users with a relatively high degree of confidence, this provides the necessary location information needed to estimate individual user impact on the use of public services at a location.

For example, when a mobile phone is being used at a location, such as a home or office, it implies that the associated person is also at the location. Thus, it is likely that electrical power is also being currently used at the location in response to the presence of the user. This electrical power may be used for heating or cooling of the location, lighting in the location, etc. . . . . . Accordingly, a portion of this electrical power being used can be attributed to the presence of the user. Additionally, if this status information is combined with other information regarding the user's behavior at the location with respect to appliances is collected, an even more accurate estimate of energy usage of these other appliances at the location can be obtained. For example, in the case of a workplace, the user may utilize a computer or device. Accordingly, if a user's mobile phone is detected as in use at his workplace, this implies that it is likely that his computer and associated peripherals are also drawing power. Therefore, the estimate of usage attributable to the user can also include the usage associated with these appliances.

Therefore, in the various embodiments of invention, a system and method for managing delivery of public services is provided. In the system and method, communications devices are registered to identify locations and appliances at these locations associated with users of the communications devices. Thereafter, the status of the communications devices is determined and is used to determine an estimate the usage of public services by the users at the locations. The usage information can then be used by utilities to manage delivery of services. A system configured for such a purpose is shown in FIG. 1.

Although the various exemplary embodiments will be described herein with respect to management of a power grid or portions thereof, the various embodiments of the invention are not limited in this regard. Rather, the systems and methods described herein are equally applicable to the management of any other types of public services.

As shown in FIG. 1, system 100 includes a utility 102 generating and/or distributing the public services, at least one consumer location 104 using the public services, and an infrastructure 106 for delivering the public services to the at least one consumer location 104. In the case of electrical power, utility 102 can include elements for electricity generation, electric power transmission, and electricity distribution elements for providing electrical power to infrastructure 106. Utility 102 can also include a utility data hub 102*a* for modeling electrical demand, managing the amount of electrical power provided to infrastructure 106, and performing other computing and data management tasks at utility. Computing systems for modeling electrical demand and managing the amount of electrical power provided to an infrastructure are well-known to one or ordinary skill in the art and will not be described herein.

An infrastructure 106 can include one or more physical elements or components for delivering the public services over a local distribution network. In the case of electrical power, infrastructure 106 can include transmission lines, substations, standalone transformer units, and any other components necessary for providing electrical power to consumer locations 104. Each consumer location 104 coupled to infrastructure 106 can also include a plurality of appliances 108. As used herein, the term "appliance" refers to a device that uses or consumes a public service provided by a public utility. For example, in the case of electrical power, appliances 108 can include a central heating/cooling system, household water heating systems, household appliances, and a pool pumping system, as shown in FIG. 1. However, the invention is not limited in this regard. For example, additional appliances can include washing/drying appliances, security and surveillance systems, office equipment, entertainment systems, electric vehicles, or any other apparatus needing to draw electrical power. Additionally, appliances can also include any apparatus that generates electrical power for use at a location 104. For example, appliances 108 can also include solar power cells, wind-powered turbines, and any other electrical power generating devices powered by sources other than infrastructure 106.

In a conventional smart grid system, each of locations 104 would typically have a smart meter and smart appliances, each having a data link to utility data hub 102a for directly exchanging usage information and other information with utility data hub 102a. However, as described above, upgrading multiple locations with smart meters and smart appliances is generally costly and requires a significant amount of time to upgrade an entire local distribution network. Further, even when smart appliances are available, many consumers would likely continue using existing appliances until a replacement is required. Accordingly, even when partial adoption of smart grid technologies occurs, utilities will only have a limited view of actual usage. As a result, utilities' ability to accurately model and mange usage of public services will still be limited. Therefore, as an alternate means for generating usage data for use in estimating and modeling usage of public services in a local distribution network, the various embodiments of the invention utilize status location of communications devices associated with users and usage profiles for such users, as described below.

As shown in FIG. 1, the communications devices 110 at the one or more locations 104 are configured to exchange status information over a network 112 with an estimation/registration (E/R) system 114. Network 112 can comprise one or more wireless and/or wireline communications links between communications devices 110 and E/R system 114. In some embodiments of the invention, one or more communications devices 110 associated with a location 104 can be configured to transmit status information to the estimation/registration server 114 over a network connection 112. In other embodiments of the invention, the E/R system 114 can be configured to monitor the network status of the communications devices. In other embodiments of the invention, the E/R system 114 can be configured to poll one or more of the communications devices 110 to determine their status. However, the various embodiments of the invention are not limited to any one of the methods described above. Rather, any combination of the methods described above can be used in the various embodiments of the invention.

In addition to collecting status information for the communications devices 110, the E/R system 114 is also used to register communications devices 110, create usage profiles associated with the communications devices 110, and to provide an estimate usage of public services. A detailed description of the E/R system 114 and its operation will be described below in greater detail with respect to FIGS. 2 and 3. Once the E/R system 114 generates estimated usage data, the data can then be delivered over a secure network link 116 back to utility 102 and utility data hub 102a. At utility data hub 102a, the estimated data can be used to generate and/or update usage models or otherwise manage operation of utility 102 and infrastructure 106.

Although FIG. 1 shows a set of communications devices 110 being associated with one of locations 110, the various embodiments of the invention are not limited in this regard. In the various embodiments of the invention, one or more of communications devices 110 can be portable (e.g., a mobile phone and/or portable computing device) and therefore can be associated with more than one of locations 104. For example, a mobile may be used by a user at a home location and a workplace location. Furthermore, more than one of communications devices 110 can be associated with a single user. Thus, when status information is received from both devices, a more accurate estimate of usage can be obtained.

In the various embodiments of the invention, a customer interface device 118 can also be provided and used for interacting with user. For example, the customer interface device 118 can be used for entering and accessing registration information for E/R system 114. In another example, the customer interface device 118 can be used to view the estimated usage information from E/R system 114 and/or to view actual usage information from utility 102. Additionally, the customer interface device 118 can also be used to provide non-usage information to users. For example, utility data hub 102a can forward information regarding programs and services available from the public utility. In another example, third party data hub 122 can also be linked to E/R system 114 via a network link 124. Accordingly, based on usage information and/or registration information in the E/R system 114, the customer interface 118 can also be configured to present customers with information regarding goods and services available from third parties.

In FIG. 1, networks 112, 116, 120, and 124 are shown as separate networks. However, the various embodiments of the invention are not limited in this regard. In some embodiments, two or more of these networks can be the same. Further, each of networks 112, 116, 120, and 124 can comprise one or more other communications networks. For example, each of communications devices 110 shown in FIG. 1 may communicate with E/R system 114 via a different network connection. Thus a mobile phone may connect over one or more types of wireless network, while a desktop computer or video game console may connect over a wireline network.

Although FIG. 1 shows customer interface device 118 as a separate component, the various embodiments of the invention are not limited in this regard. Rather, the customer interface device 118 can be one of communications devices 110. Further, although E/R system 114 is shown as being separate from utility 102, the functions of E/R system can also be performed within utility 102. Finally, although utility 102, E/R system 114, and third party systems 122 are shown as single components, each of these may be implemented in a distributed fashion over a network.

Figure 2:
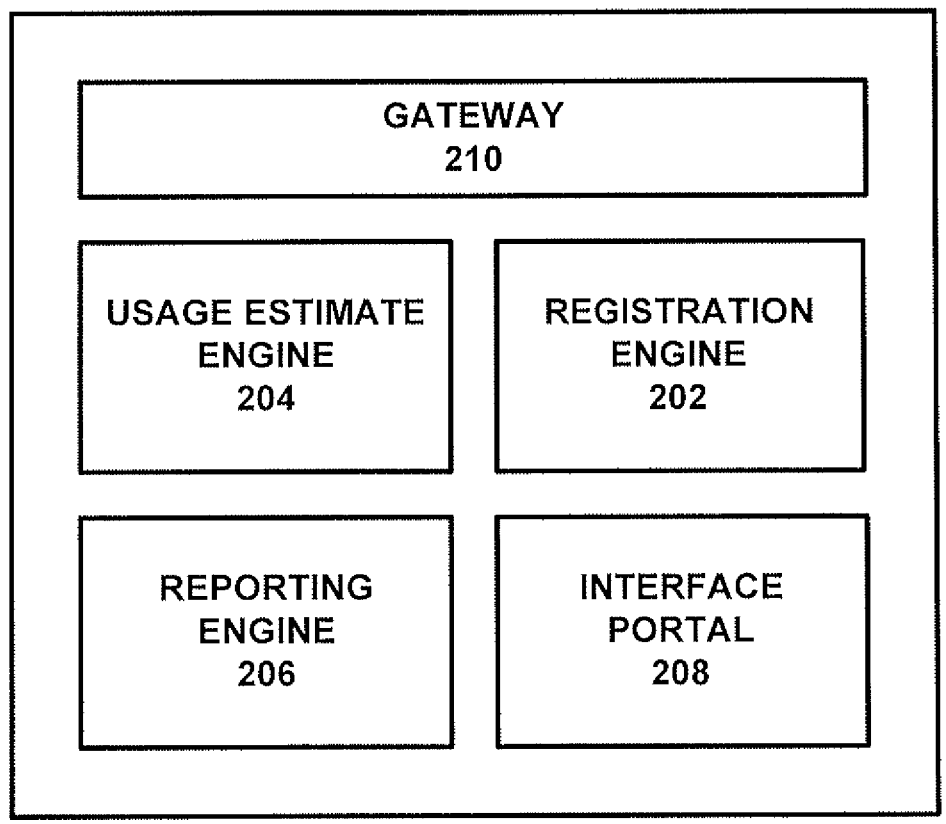
FIG. 2 is a schematic diagram of an exemplary configuration for the estimation/registration (E/R) system in FIG. 1 in accordance with an embodiment of the invention.

As described above with respect to FIG. 1, registration of communications devices, estimation of usage data, and delivery of usage data is primarily managed by E/R system 114. One exemplary configuration for E/R system 114 is shown in FIG. 2. FIG. 2 is a schematic diagram of an exemplary configuration for E/R system 114 in FIG. 1 in accordance with an embodiment of the invention. As shown in FIG. 2, E/R system 114 includes at least a registration engine 202, a usage estimate engine 204, and a reporting engine 206.

As described above, in order for E/R system 114 to provide a more accurate estimate usage of public services at a location due to the presence of a user, registration information is provided to the E/R system 114. The registration information identifies a communications device, users associated with the communications devices, locations associated with the users, and appliances associated with the user at the various locations. In the exemplary configuration shown in FIG. 2, registration tasks are performed by the registration engine 202.

The registration information can be provided to registration engine 202 in a variety of ways. For example, in some embodiments of the invention, the registration information can be input for a user via a network interface generated by the registration engine 202. For example, this network interface can be provided for the user at customer interface 118 or one of communications device 110 in FIG. 1. The registration information can be input either anonymously or as a registered user.

Further, the network interface provided by the registration engine 202 can be configured for operating based on manual inputs, automated inputs, or any combination thereof. In the case of manual inputs, the registration engine 202 can be configured to provide a user with forms, surveys, questionnaires, and/or voting programs for manually entering registration information. Additionally, means for entering registration information via optical capture methods can be provided to facilitate the manual input process. For example, optical recognition methods (e.g., optical character recognition and barcode scanning) can be used to enter appliance information attached to the appliances and/or information from invoices or bills from the public utility.

In the case of automated input, the registration engine 202 can be configured to automatically interface with systems identified by a user at a location. For example, the registration engine 202 can be configured to access existing smart appliances and/or communications devices operating at a location. In another example, the registration engine can access a utility data hub or other databases to retrieve additional user information. This can include demographic information and past usage of public services. This additional information can also include past network activity, such as voice communications record, activities on social networking sites, multimedia activities, website searches, and website purchases, to name a few. However, the various embodiments of the invention can also include any other type of additional user information. For example, in some embodiments of the invention, some portions of the registration information can be provided by third parties having access to one or more portions of the registration information provided by the users. In such embodiments, the third parties can examine and supplement the registration information with additional registration information that will improve accuracy during estimation of usage of public services.

The various embodiments of the invention are also not solely limited to network interface based methods for providing registration information. In some embodiments of the invention, registration information can be entered from hardcopy forms manually or via optical recognition methods. In other embodiments of the invention, an end user can interact with a customer service representative to enter the registration information into registration server 202.

Once the registration information is collected by registration engine 202, a usage estimate engine 204 can be used to estimate usage of public services based on the registration information. For example, registration information, such as location, user demographics, appliance information, and user behavioral data can be combined with other variables, such as weather, time of day, and season of the year to provide an accurate estimate of real-time customer energy consumption. In the various embodiments of the invention, the registration information is also used by the usage estimate engine 204 to generate one or more usage profiles for each user. Generation of such profiles will be described below in greater detail with respect to FIG. 3. Accordingly, estimation of usage of public services can be simplified by basing the estimation on a correct profile.

After usage is estimated by usage estimate engine 202, a reporting engine 206 can be used to provide the estimated usage data to one or more destinations. For example, reporting engine 206 can be used to provide the estimated usage data to the user via a communications device (e.g., communications devices 110 or customer interface device 118). The reporting engine can also provide one or more applications to allow the user to view and interact with real-time data to help the end-user to understand, control and manage current energy consumption. The reporting engine 206 can also be used to provide additional non-usage data generated at a third party data hub or a utility data hub. Accordingly, the usage data provided to users can be augmented with non-usage data. For example, the user can be provided with other data such as weather information, news, and advertisements, to name a few. Furthermore, the reporting engine 206 can also be used for generating information for other types of users. For example, in some embodiments of the invention, the reporting engine 206 can also be used for generating information for persons associated with the utility or persons associated third party goods and services.

In some embodiments of the invention, an additional interface can be provided for accessing and managing the various components of E/R system 114. As shown in FIG. 2, this can be provided via an interface portal 208. In some embodiments of the invention, the interface portal 208 can be an application programming interface (API) portal. For example, interface portal 208 can be a simple object access protocol (SOAP)-based API portal or a representational state transfer (REST)-based API portal. However, the various embodiments of the invention are not limited to these particular interface portals. Rather, in the various embodiments of the invention, the interface portal can be implemented using other types of portals, including hardware-based portals, software-based portals, or any combination thereof. The interface portal 208 can be used to define how registration information is collected by registration engine 202, how usage is estimated by usage estimate engine 204, and how data is reported to users by reporting engine 206. Although E/R system 114 would be managed by a utility in some embodiments, in other embodiments of the invention, management of E/R system can be performed by third parties. Accordingly, in the various embodiments of the invention, the interface portal 208 can be used by developers, utilities, retailers, OEMs, advertising agencies/publishers, social networks, governments, and other service providers to augment their existing services and/or provide new and improved applications and content for users.

As described above, a large number of communications devices can potentially exchange information with E/R system 114. In many cases, the communications devices will be configured to operate using different sets of protocols. Accordingly, to facilitate the exchange of information between E/R system 114 and such communications devices, E/R system 114 can also include a gateway 210. As one of ordinary skill in the art will recognize, a gateway typically includes devices such as protocol translators, impedance matching devices, rate converters, fault isolators, signal translators, and any other devices necessary to provide compatibility between devices communicating using different sets of protocols. In some embodiments, the gateway 210 can also operate as a firewall for the E/R system 114. Configuration and operation of gateways is well known to those of ordinary skill in the art and will not be described herein. In some embodiments of the invention, communications devices configured for interfacing with gateway 210 can also include additional hardware, software, or any combination thereof, to facilitate communications with gateway 210. For example, communications devices can include a hardware and/or software-based agent that manages communications with the gateway 210. Such agents can also be configured to provide additional functionality to enhance exchange of registration information, information, and usage and non-usage information.

In some embodiments of the invention, E/R system 114 can be configured to limit the dissemination of user data to third parties, utilities, and any other entities accessing the E/R system 114. For example, in some embodiments of the invention, communications with users, known third parties, and a utility can be limited to secure and trusted communication channels. Other communications means, such as unsecure messaging services, email, and social networks can be used to provide only limited information, such as alerts and notices for users and other parties. Further, E/R system 114 can also be configured to limit access to user data over secure channels based on a privacy framework. Thus, E/R system 114 can be configured to include software and/or hardware security safeguards to limit access to registration information and usage information associated with users. Implementation of a privacy framework for disseminating data to multiple types of users is well known in the art and will not be described herein.

Figure 3:
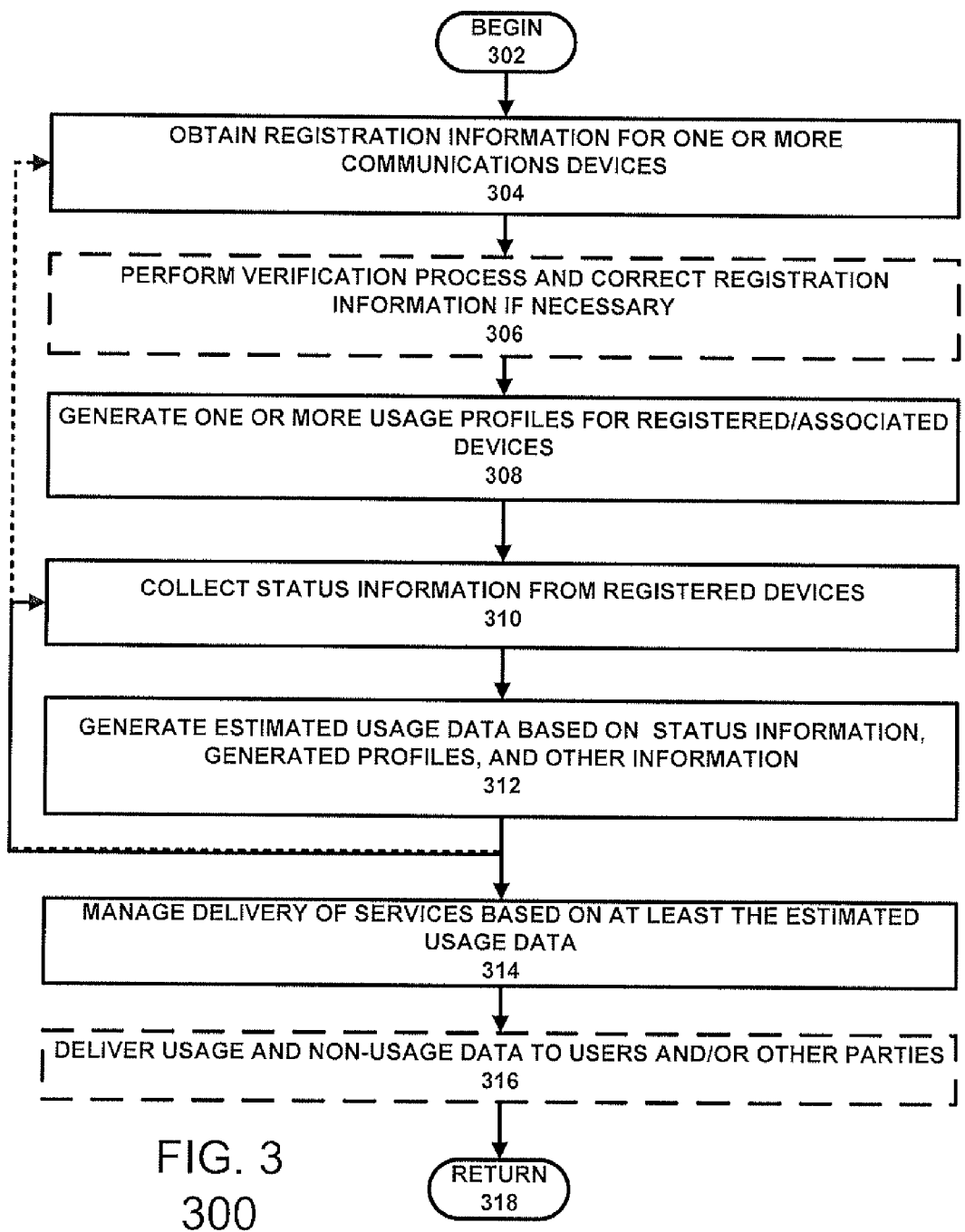
FIG. 3 is a flowchart of steps in an exemplary method for managing delivery of public services.

Referring now to FIG. 3, a flowchart is provided that shows various steps in an exemplary method 300 for managing delivery of public services in accordance with an embodiment of the invention. Method 300 begins at step 302 and continues to step 304. At step 304, registration information for one or more communications devices is obtained. As described above, registration information for each communications device in the various embodiments of the invention can include user information, location information, and appliance information. The registration information can be obtained via manual input or automated input methods, as described above.

The user information can specify the identity and other information for the user associated with the communications device. For example, the user information can include demographic information for the user. Such demographic information can include sex, race, age, income, physical disabilities, mobility (in terms of travel time to work, number of vehicles, or type of vehicles), educational attainment, home ownership, or employment status. However the invention is not limited in this regard and user information can also include any other personal information which is known to affect usage of public services by a user. For example, since plugging in an electric car will result in addition usage of electric power, registration information regarding whether user owns such a car will be obtained during the registration step.

The location information can specify one or more physical locations associated with the communications device and the user. For example, a user may utilize a communications device at home, at work, and other locations, as described above. Additionally, the location information can specify characteristics of the location which may affect usage of public services. For example, location information can include construction details or other location or building details which may affect heating and cooling costs of a building.

The appliance information can specify one or more appliances associated with the user at the various locations identified in the location information. In the various embodiments, the appliance information can not only identify appliances commonly used by multiple users at a location, but can also be used to identify appliances primarily used by the user when located at a particular location. For example, a user may be associated with a particular computer at a workplace, as described above. Thus, a user's presence at a workplace indicates usage of common appliances, such as heating, cooling, and lighting systems, but also the use of particular appliances, such as the user's workplace computer. In some embodiments, the appliance information can also specify additional information regarding behaviors of the user with respect to the appliances. For example, a user may be associated with a particular appliance, but may generally use the appliance for only a limited period of time. Alternatively, the appliance information may specify that usage of the appliance occurs only when the status information indicates a particular type of activity occurring.

Referring back to FIG. 3, once registration information is obtained at step 304, an optional verification process can be performed at step 306. That is, the registration information can be verified by the user. Alternatively, the registration information can be compared to information in one or more databases to verify the registration information. For example, if the location information fails to match location information stored in governmental databases, the user may be asked to confirm or correct the disparities in the data. In another example, if a communications device or an appliance is currently registered to a different user, the user may be asked to confirm that they are the primary user. For example, a family may have several mobile telephones, all registered to the same person. However, each family member may be the primary user of one of the mobile phones. Thus, the verification process would ask users to confirm the primary user of the appliance and/or the communications device. In some embodiments, if an appliance or communications device is registered with multiple users then both users can be requested at step 306 to identify conditions or other information that would indicate when they are the primary users of the appliance or communications device.

After the registration information is obtained at step 304 (and optionally verified at step 306), method 300 can proceed to step 308. At step 308, one or more usage profiles can be generated for the registered communications device based at least on the registration information. In the various embodiments of the invention the number of usage profiles can principally be based on the number of communications devices and the number of locations associated with the communications devices, as specified in the registration information. Thus, for each location, at least one profile can be generated for each communications device. In the various embodiments, the profiles can be generated in a variety of ways. For example, in some embodiments of the invention, a profile can be constructed by starting with a generic profile for a type of user at a type of location. Afterwards, based on the user-specific information in the registration information, the generic profile can be modified. In other embodiments of the invention, a profile can be generated based from first principles or based on a set of rules. For example, the various portions of the registration information can be scored and/or ranked to their relevancy to usage of public services. Thereafter a scoring mechanism can be generated to associate the registration information with usage based on the status information and other information external to the registration information. In some embodiments, a combination profile can be generated. That is, a profile can be associated with two or more communications devices being used by a user at a single location. However, the various embodiments of the invention are not limited to the methods described above. Rather, any other methods for generating usage profiles for estimating usage of public services can be used in the various embodiments of the invention.

In some embodiments of the invention, the registration information can be combined with data from other sources to generate the profiles. Therefore, in such embodiments of the invention, additional information may be retrieved to augment any information in the registration information. For example, if location information is limited to identifying information for locations, an E/R system may access one or more databases to obtain additional details regarding the locations. In some embodiments of the invention, such information can be saved as part of the registration information for future use. In some embodiments of the invention, the additional information can be past usage data obtained from a utility data hub. As a result, once the profile is completed, the profile can be compared to past usage data to further tune and adjust the user profile.

In some embodiments of the invention, a plurality of user profiles may be generated for a single location. For example, multiple user profiles can be specified for a single location for different seasons of the year. In another example, multiple user profiles can be specified for a single location based on the presence or absence of other users. That is, since usage of some public services may not significantly change based on the number of persons (e.g., heating and cooling systems) a different profile can be provided when the user is alone at a location and when the user and other users are also present at the location. However, the various embodiments of the invention are not limited in this regard and multiple profiles for a single location can be generated based on other factors. For example, a profile can be generated for each type of communications device associated with the user at a location or for different combinations of active communications devices at a location.

Referring back to FIG. 3, once the profiles are generated at step 308, usage estimation can be performed. First at step 310, status information is retrieved from the communications devices registered with the E/R system. As described above, the status information can include information regarding a current location of the communications devices. Further, the status information can also include information regarding current activities of the communications devices, as also described above. After the status information is obtained from the registered communications devices at step 310, usage data can be estimated at step 312. At step 312, the status data can be used to select the correct profile for each user at a location and the selected profile is thereafter used to estimate usage. That is, a profile generated at step 308, associated with the status information and/or the presence and/or activities of other users at a location can be selected for estimating usage. Additionally, other information, such as weather, date, time of day, etc. . . . , can also be used as inputs for the profile or to select a particular profile. After the correct profile and relevant variables are identified for a user, the estimated usage of public services by the user can be estimated and delivered to the user, the utility, or third parties, as described above with respect to FIGS. 1 and 2.

In the various embodiments of the invention, the usage estimates generated at step 312 provide only a snapshot of usage during an interval of time. Accordingly, in the various embodiments of the invention, steps 310 and 312 can be repeated to provide a continuous stream of user usage data. Accordingly, new or updated status information obtained at step 310 can be used at step 312 to select a new user profile and generate new usage information. In the various embodiments of the invention, the interval of time for repeating steps 310 and 312 can be any period of time (e.g., days, hours, minutes, seconds, etc. . . . ). However, a shorter the interval of time allows usage to be estimated more accurately since longer time intervals may fail to timely capture changes in the locations of users or their activities. In the various embodiments of the invention, this process can be performed in a variety of ways. For example, in some embodiments of the invention, once a profile is selected, the selected profile may be used to continuously generate usage data. The data generation process is then only interrupted when a change in status information is detected. In another example, the usage data can be reported to the utility as a rate of use. Afterwards, no additional data is reported to the utility until the rate of use changes in response to the change in status information.

In some embodiments of the invention, steps 304-308 can also be repeated in order to update usage profiles. For example, a user may need to update the registration information to add and/or remove locations or communications devices, thus requiring a change in the usage profiles. In another example, data obtained from other sources may have also changed and may also require a change in the usage profiles. Accordingly, based on these and other changes, the profiles can be updated or regenerated as needed. In such embodiments, the frequency of updating can vary. For example, in some embodiments, the profiles can be updated after a particular time interval has elapsed. In other embodiments, profiles can be updated if a change is detected in one or more of the profiles. Further, a combination of update methods can be used.

As usage data is estimated at step 312, the usage data can then be used at step 314 by a utility or other entity manage delivery of public services. For example, in the case of a local power company, the usage data can be used to update usage models, determine if additional power needs to be provided to one or more portions of the local distribution network, and/or identify potential issues in the local distribution network or at locations serviced by the local power company. In some embodiments of the invention, the utilities and other entities receiving the estimated usage data can also receive one or more portions of the registration information associated with the usage data. Thus, these entities can utilize the registration data, the estimated usage data, and other information to perform further modeling, determine usage trends among types or groups of users, identify goods and services, or perform other types of analyses.

In conjunction with the management of public services in step 314, the estimated usage data can be delivered to users or any other parties at step 316. Therefore, at step 316, usage (and optionally non-usage information) can be delivered to users and other interested parties. As described above, the non-usage data can include information regarding goods and services associated with the usage data or the registration information. However, the invention is not limited in this regard and the non-usage data can include other information that may be of interest to the user. Once step 316 is completed, method 300 proceeds to step 318 and resumes previous processing, including repeating method 300.

Figure 4:
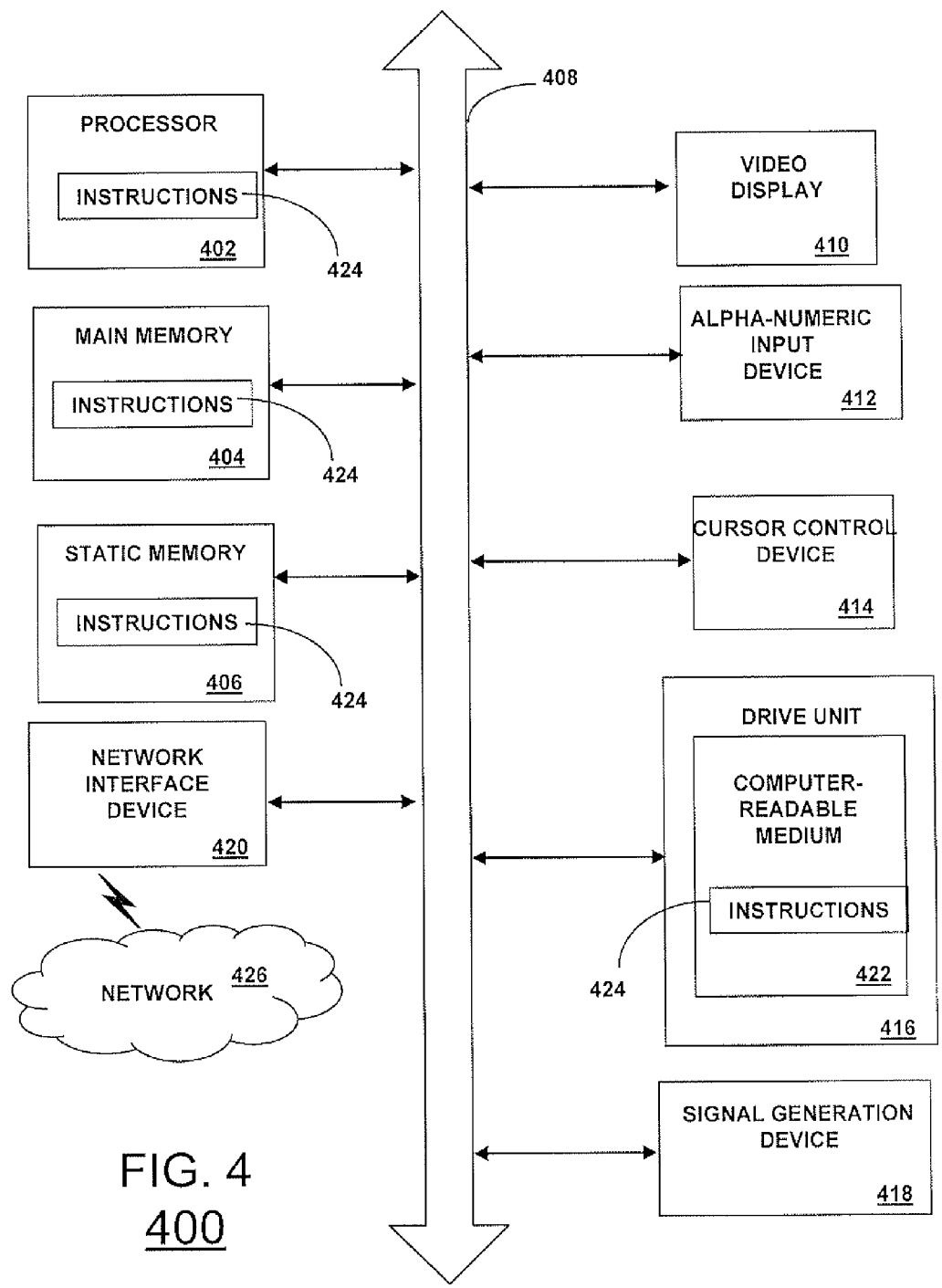
FIG. 4 is a schematic diagram of a computer system for executing a set of instructions that, when executed, can cause the computer system to perform one or more methodologies and procedures in accordance with the various embodiments of the invention.

FIG. 4 is a schematic diagram of a computer system 400 for executing a set of instructions that, when executed, can cause the computer system to perform one or more of the methodologies and procedures described above. It is to be understood that in the various embodiments of the invention, computer system 400 can include more or less components than those shown in FIG. 4. In some embodiments, the computer system 400 operates as a standalone device. In other embodiments, the computer system 400 can be connected (e.g., using a network) to other computing devices. In a networked deployment, the computer system 400 can operate in the capacity of a server or a client developer machine in server-client developer network environment, or as a peer machine in a peer-to-peer (or distributed) network environment.

The machine can comprise various types of computing systems and devices, including a server computer, a client user computer, a personal computer (PC), a tablet PC, a laptop computer, a desktop computer, a control system, a network router, switch or bridge, or any other device capable of executing a set of instructions (sequential or otherwise) that specifies actions to be taken by that device. It is to be understood that a device of the present disclosure also includes any electronic device that provides voice, video or data communication. Further, while a single computer is illustrated, the phrase "computer system" shall be understood to include any collection of computing devices that individually or jointly execute a set (or multiple sets) of instructions to perform any one or more of the methodologies discussed herein.

The computer system 400 can include a processor 402, such as a central processing unit (CPU), a graphics processing unit (GPU, or both), a main memory 404 and a static memory 406, which communicate with each other via a bus 408. The computer system 400 can further include a display unit 410, such as a video display (e.g., a liquid crystal display or LCD), a flat panel, a solid state display, or a cathode ray tube (CRT). The computer system 400 can include an input device 412 (e.g., a keyboard), a cursor control device 414 (e.g., a mouse), a disk drive unit 416, a signal generation device 418 (e.g., a speaker or remote control) and a network interface device 420.

The disk drive unit 416 can include a computer-readable storage medium 422 on which is stored one or more sets of instructions 424 (e.g., software code) configured to implement one or more of the methodologies, procedures, or functions described herein. The instructions 424 can also reside, completely or at least partially, within the main memory 404, the static memory 406, and/or within the processor 402 during execution thereof by the computer system 400. The main memory 404 and the processor 402 also can constitute machine-readable media.

Dedicated hardware implementations including, but not limited to, application-specific integrated circuits, programmable logic arrays, and other hardware devices can likewise be constructed to implement the methods described herein. Applications that can include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the exemplary system is applicable to software, firmware, and hardware implementations.

In accordance with various embodiments of the present disclosure, the methods described herein can be stored as software programs in a computer-readable storage medium and can be configured for running on a computer processor. Furthermore, software implementations can include, but are not limited to, distributed processing, component/object distributed processing, parallel processing, virtual machine processing, which can also be constructed to implement the methods described herein.

The present disclosure contemplates a computer-readable storage medium containing instructions 424 or that receives and executes instructions 424 from a propagated signal so that a device connected to a network environment 426 can send or receive voice and/or video data, and that can communicate over the network 426 using the instructions 424. The instructions 424 can further be transmitted or received over a network 426 via the network interface device 420.

While the computer-readable storage medium 422 is shown in an exemplary embodiment to be a single storage medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any device that is capable of storing, encoding or carrying a set of instructions for execution by the machine and that cause the machine to perform any one or more of the methodologies of the present disclosure.

The term "computer-readable medium" shall accordingly be taken to include, but not be limited to, solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives considered to be a distribution medium equivalent to a tangible storage medium. Accordingly, the disclosure is considered to include any one or more of a computer-readable medium or a distribution medium, as listed herein and to include recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, and HTTP) represent examples of the state of the art. Such standards are periodically superseded by faster or more efficient equivalents having essentially the same functions. Accordingly, replacement standards and protocols having the same functions are considered equivalents.

While various embodiments of the present invention have been described above, it should be understood that they have been presented by way of example only, and not limitation. Numerous changes to the disclosed embodiments can be made in accordance with the disclosure herein without departing from the spirit or scope of the invention. Thus, the breadth and scope of the present invention should not be limited by any of the above described embodiments. Rather, the scope of the invention should be defined in accordance with the following claims and their equivalents.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

The terminology used herein is for the purpose of describing particular embodiments only and is not intended to be limiting of the invention. As used herein, the singular forms "a", "an" and "the" are intended to include the plural forms as well, unless the context clearly indicates otherwise. Furthermore, to the extent that the terms "including", "includes", "having", "has", "with", or variants thereof are used in either the detailed description and/or the claims, such terms are intended to be inclusive in a manner similar to the term "comprising."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

What is claimed is:

1. A method of managing a public service provided by a utility, comprising:
   receiving from a first source, by an electronic circuit, presence information comprising a number of users present at each of a plurality of locations, wherein said number of users is determined based on at least one of activity information and location information from one or more communications devices at each of said plurality of locations;
   receiving from a second source, by said electronic circuit, consumption information comprising an amount of energy consumed at each of said plurality of locations;
   generating, by said electronic circuit, an estimated usage of said public service at each of said plurality of locations based on said presence information and said consumption information; and
   generating, by said electronic circuit, a predicted future consumption of said public service for each of said plurality of locations based on said estimated usage from each of said plurality of locations.

2. The method according to claim 1, further comprising selecting at least one of said communication devices to comprise a portable handheld wireless communications device that is commonly carried by one of said users.

3. The method according to claim 1, further comprising using registration information for said communication devices in generating said estimated usage.

4. The method according to claim 3, further comprising obtaining at least a portion of said registration information directly from said users.

5. The method according to claim 4, further comprising obtaining at least a portion of said registration information from one or more databases containing information concerning at least one of said users, said plurality of locations, and said communications devices.

6. The method according to claim 3, wherein said registration information for each one of said communications devices comprises one or more information items selected from the group consisting of user information for a one of said users associated with said each one of said communication devices and location information specifying one or more locations associated with said each one of said communication devices.

7. The method according to claim 6, wherein said registration information further comprises appliance information for one or more appliances located at each of said locations associated with said each one of said communication devices.

8. The method according to claim 1, wherein said activity information comprises network activity information and non-network activity information.

9. The method according to claim 1, further comprising generating a usage profile for each of said plurality of locations based on said presence information and said consumption information, wherein said usage profile comprises a correlation between said number of users present and said amount of energy consumed, and wherein said estimated usage is generated based on said usage profile.

10. The method of claim 1, further comprising managing the delivery of said public service across all of said plurality of locations based on an aggregate of said predicted future consumption of said public service for each of said plurality of locations.

11. The method according to claim 10, wherein managing said public service comprises adjusting an availability of said public service.

12. The method according to claim 11, wherein said adjusting step further comprises adjusting at least one of a supply, an availability and a routing of said public service.

13. A system for managing a public service provided by a utility, comprising:
   an estimation/registration (E/R) system, comprising:
      a memory configured to:
         store presence information, received from a first source, of one or more communications devices at each of a plurality of locations, wherein said presence information includes at least one of activity information for said communications devices and location information for said communications devices, and
         store consumption information, received from a second source, comprising an amount of energy consumed at each of said plurality of locations; and
      a processor configured to:
         determine a number of users present at each of said plurality of locations based on said status information,
         generate an estimated usage of said public service at each of said plurality of locations based on said usage profile, and
         generate a predicted future consumption of said public service for each of said plurality of locations based on said estimated usage from each of said plurality of locations.

14. The system of claim 13, wherein at least one of said communication devices comprises a portable handheld wireless communications device that is commonly carried by one of said users.

15. The system of claim 13, wherein said processor is further configured for using registration information for said communication devices as an aid in generating said estimated usage.

16. The system of claim 15, wherein said processor is further configured for obtaining at least a portion of said registration information directly from said users.

17. The system of claim 16, wherein said processor is further configured for obtaining at least a portion of said registration information from one or more databases containing information concerning at least one of said individuals, said plurality of locations, and said communications devices.

18. The system of claim 15, wherein said registration information for each one of said communications devices comprises one or more information items selected from the group consisting of user information for a one of said users associated with said each one of said communication devices and location information specifying one or more locations associated with said each one of said communication devices.

19. The system of claim 18, wherein said registration information further comprises appliance information for one or more appliances located at each of said locations associated with said each one of said communication devices.

20. The system of claim 13, wherein said activity information comprises network activity information and non-network activity information.

21. The system of claim 13, further comprising a utility data hub communicatively coupled to said E/R system, said utility data hub configured for receiving said estimated usage data from said E/R system.

22. The system of claim 21, wherein said utility data hub is further configured to adjust an availability of said public service across all of said plurality of locations based on an aggregate of said predicted future consumption of said public service for each of said plurality of locations.

23. The system of claim 22, wherein said utility data hub is configured to adjust said availability of said public service by modifying at least one of a supply, an availability and a routing of said public service.

24. The system of claim 13, wherein said processor is further configured to generate a usage profile for each of said plurality of locations based on said presence information and said consumption information, wherein said usage profile comprises a correlation between said number of users present and said amount of energy consumed, and wherein said estimated usage of said public service for each of said plurality of locations is generated based on said usage profile for each of said plurality of locations.

* * * * *